United States Patent [19]

Dietrich, Sr. et al.

[11] Patent Number: 4,574,715

[45] Date of Patent: Mar. 11, 1986

[54] AGRICULTURAL FERTILIZER APPLICATOR

[75] Inventors: William J. Dietrich, Sr., Congerville; Cary L. Sizelove, Sr., Eureka; Dean A. Knobloch, Goodfield, all of Ill.

[73] Assignee: DMI, Inc., Goodfield, Ill.

[21] Appl. No.: 671,884

[22] Filed: Nov. 15, 1984

[51] Int. Cl.[4] ............................................. A01C 23/02
[52] U.S. Cl. ............................................. 111/7; 111/85; 172/140; 172/166; 172/180; 172/182; 172/657; 172/705
[58] Field of Search ............ 111/6, 7, 52, 85, 86, 111/87; 172/139, 140, 142, 166, 180, 182, 497, 500, 572, 573, 657, 705, 710

[56] References Cited

U.S. PATENT DOCUMENTS

| | | | |
|---|---|---|---|
| 2,701,513 | 2/1955 | Hyland et al. | 172/166 |
| 2,722,902 | 11/1955 | Hyatt | 111/85 X |
| 2,906,353 | 9/1959 | Rogers | 172/711 X |
| 2,988,025 | 6/1961 | Johnston | 111/6 |
| 3,237,577 | 3/1966 | Wilkins | 111/7 |
| 3,292,562 | 12/1966 | Clark | 111/7 |
| 3,319,589 | 5/1967 | Moran | 172/573 |
| 3,745,944 | 7/1973 | Yetter | 111/7 |
| 3,799,079 | 3/1974 | Dietrich | 172/710 X |
| 4,005,757 | 2/1977 | Hess | 172/710 |
| 4,426,940 | 1/1984 | Brain | 111/7 |

OTHER PUBLICATIONS

Anon. Uni-Sealer TM (sales leaflet), DMI, Inc., Rt. 150 E, Box 65, Goodfield, Ill. 61742 pub. 9/7/83.

Primary Examiner—James R. Feyrer
Attorney, Agent, or Firm—Emrich & Dithmar

[57] ABSTRACT

An improved fertilizer applicator includes a rolling coulter and a knife both mounted to a single tool bar mount but with separate spring cushions for independent clearing action and designed for improved clearance suitable for use in heavy residue.

6 Claims, 3 Drawing Figures

AGRICULTURAL FERTILIZER APPLICATOR

BACKGROUND OF THE INVENTION

The present invention relates to agricultural fertilizer applicators; and more particularly, to a fertilizer applicator in which the fertilizer is deposited in a trench or furrow formed behind a knife. The knife is located to follow behind a colter which cuts residue, and a closing assembly such as a packer wheel or other mechanism is typically located behind the knife to close the furrow after the fertilizer is deposited.

Typically, a number of separate applicator knives may be mounted to a common frame or tool bar which is pulled by a tractor and extends transversely of the direction of travel of the tractor. The applicator knives are spaced laterally so that a wide swath of land may be treated in a single pass of the tractor. The applicators may deposit liquid fertilizer in the form of anhydrous ammonia, dry fertilizer in pellet form, or a combination of both. The illustrated embodiment of the invention is designed for application of anhydrous ammonia. In this case, a tank of anhydrous ammonia may be carried by the same frame to which the tools are mounted or by a separate wheeled caddie which is pulled behind the tool bar and acts as a source of liquid fertilizer to supply each of the applicator knives.

One such applicator is disclosed in U.S. Pat. No. 3,799,079, issued Mar 26, 1974 for "Applicator for Depositing Anhydrous Ammonia Underground". As indicated in that patent, it is important to keep the knife aligned directly behind the oolter so that the knife follows directly in the cut line of the colter. Even a slight misalignment of the knife relative to the colter can cause residue or "trash", as it is sometimes called, to bridge across the knife, thereby increasing draft forces of the implement.

The problem of keeping the knife aligned with the coulter was addressed in the '079 patent, identified above. That apparatus was, however, used primarily in areas where moldboard plowing or other deep primary tillage was used. In that type of situation, the need for trash clearance between the coulter and knife was not as great as is currently found to exist because of changed farming practices. Today, more farmers are employing minimum tillage or even no tillage farming techniques, with the object of increasing the amount of crop residue lying on the surface after harvesting in hopes of reducing soil erosion. In short, what was acceptable trash clearance in agricultural equipment in the early 1970's may no longer be acceptable to many farmers. Acceptable trash clearance can be achieved by mounting the coulter and knife on separate tool bars spaced fore-and-aft, but that arrangement compounds the problem of alignment of knife and coulter, especially under hard use conditions. Further, using separate tool bars eliminates the convenience of adjusting lateral spacing between using simply by sliding one mounting assembly along its own toolbar.

In addition, in the '079 patent, a single spring cushion mechanism was used to bias both the coulter and the applicator knife into the use position. This had the effect of raising the knife when the coulter passed over an obstruction and raising the colter as the knife passed over the same obstruction. This had a tendency to increase the effective area of an obstruction and it also required that the same pre-load on the spring bias be effective for both the coulter and the knife. Farmers had no choice in the matter.

SUMMARY OF THE INVENTION

In its broader aspects, the present invention is directed to an applicator for depositing fertilizer using a forwardly-located rolling coulter for cutting crop residue followed by an applicator knife. A closing assembly for closing the furrow after the fertilizer is in place may also be used.

Both the coulter and the applicator knife are mounted to a single mounting mechanism which, in turn, is secured to a tool bar or transverse frame member. The coulter is mounted to a pivot arm which is pivotally mounted and spring-biased independently of the applicator knife. Further, the pivot arm is mounted in such a manner that as the coulter encounters an obstruction it is elevated from the ground-engaging use position to the elevated clearing position along a generally vertical path—as distinguished from a rearward path which would reduce clearance or obstruct operation of the knife.

The knife, on the other hand, is independently pivotally mounted and spring-biased so that when it encounters an obstruction it is raised to the clearing position independently of the coulter and in such a manner as to facilitate discharge of any accumulated residue.

Both the coulter and the knife are secured to a common mount which, in turn, is fixed to the tool bar. A rigid structural subframe extends between the mount and the knife to maintain its alignment with the coulter to minimize soil disturbance during operation. The rigid structural subframe is in the form of a box beam or strut and although it minimizes lateral deflection of the knife, it permits the knife to be elevated to the clearance position. The knife may be vertically adjusted to vary its running depth relative to the operating depth of the coulter.

Other features and advantages of the present invention will be apparent to persons skilled in the art from the following detailed description of a preferred embodiment accompanied by the attached drawing wherein identical reference numerals will refer to like parts in the various views.

DETAILED DESCRIPTION OF THE ILLUSTRATED EMBODIMENTS

Figure 1:
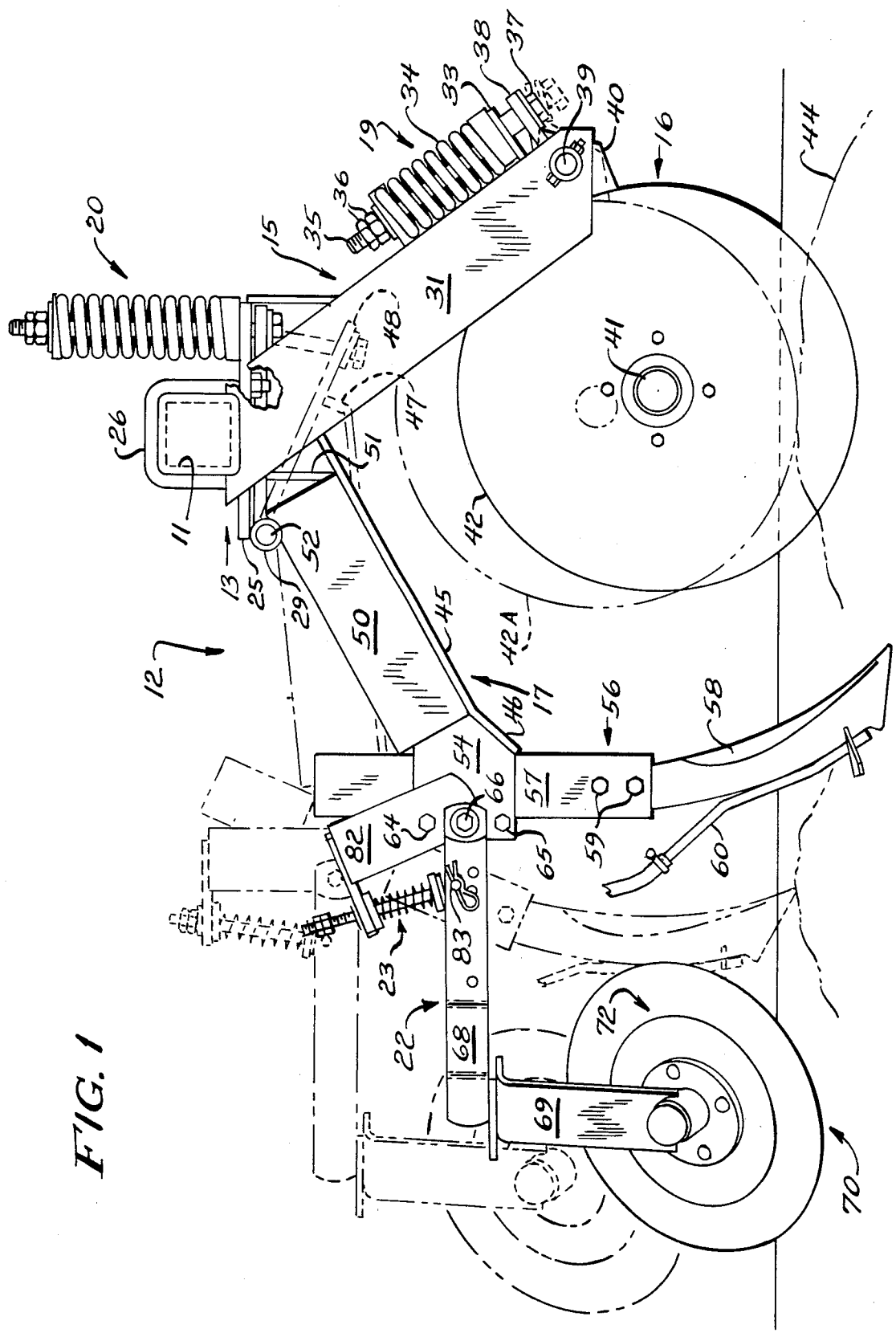
FIG. 1 is a right side elevational view of a fertilizer applicator assembly incorporating the present invention.
Figure 2:
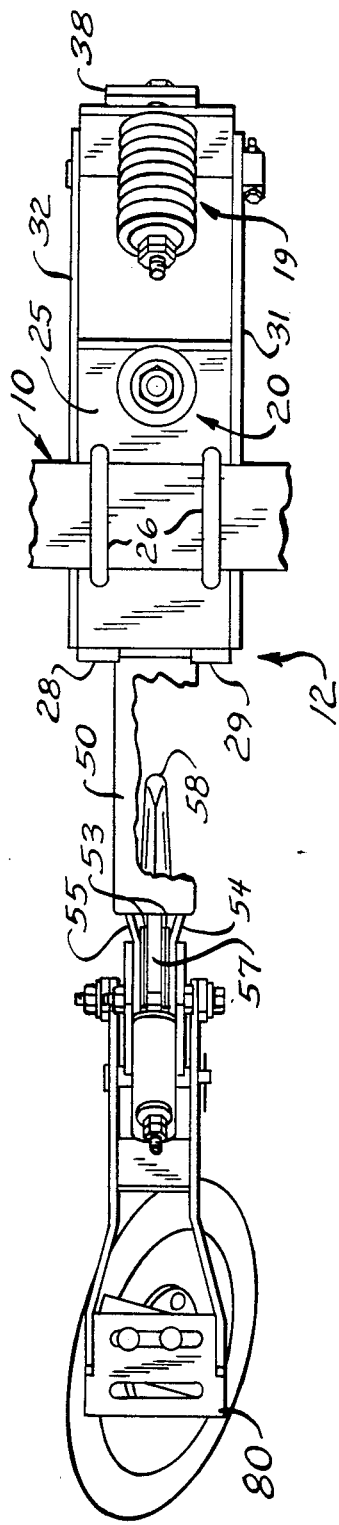
FIG. 2 is a plan view of the apparatus of FIG. 1, partially cut away to illustrate the relative position of elements.

Referring then to FIGS. 1 and 2, reference numeral 10 generally designates a frame in the form of a horizontal mounting bar 11, or tool bar, as it is sometimes called. The frame may be a pull-type frame having its own support wheels, or it may be cantilevered to the three-point hitch of a tractor.

Mounted to the tool bar 11 are a number of laterally-spaced applicator assemblies, one of which is seen in the drawing and generally designated 12. The apparatus is pulled to the right as viewed in FIGS. 1 and 2 by means of a tractor not shown.

The major components of the applicator assembly 12 include a tool bar mounting assembly generally designated 13 for rigidly mounting the applicator to the tool bar; a forwardly and downwardly extending rigid coulter subframe generally designated 15; a spring cushioned coulter assembly generally designated 16 mounted for pivot motion between a lowered use position and a raised clearing position; a knife subframe generally designated 17 pivotally mounted to the mounting assembly 13 for independent rotation between a use position and a clearing position (seen in dashed line). The spring cushion assembly for the coulter is generally designated 19: and the spring cushion assembly for the applicator knife is generally designated 20.

A furrow closer generally designated 22 is pivotally mounted to the knife subframe 17 and extends rearwardly thereof; and it also may be independently cushioned by means of a third spring cushion assembly 23.

Turning now to the structure of the tool bar mounting assembly 13, it includes a horizontal plate 25 secured against the lower horizontal surface of the tool bar 11 by means of U-bolts 26. First and second sleeves designated 28 and 29 are welded to the lower rear portion of the plate 25 to form side journals or trunnions as will be discussed. The coulter subframe 15 is formed of first and second side plates 31, 32 which are welded to the respective sides of the horizontal mounting plate 25 and may be cut out to engage and conform to the lower portion of the tool bar 11 as seen in FIG. 1. The plates 31, 32 extend parallel to one another from the mounting plate downwardly and forwardly as seen best in FIG. 1. A spring mounting plate 33 is welded between the side plates 31, 32 and serves the dual purpose of strengthening the colter subframe and mounting the lower end of a coil spring 34 of the coulter spring cushion assembly 19. A tension bolt 35 has its upper end adjustably secured to the top of the spring 34 by means of locking nuts 36 and its head 37 held beneath a bracket 38 which is fixed to an arm 40 to which the hub spindle 41 of coulter blade 42 is mounted. The arm 40 is mounted to a pivot shaft 34 for rotation about a horizontal transverse axis. A spacer may be located between the bracket 38 and the fixed plate 33 to define a limit for the use position of the coulter. The spring 34 is pre-loaded in compression, and the pre-load may be adjusted by adjusting the locking nuts 37 along the tension bolt 35.

In operation, if the coulter blade 42 encounters an obstruction as diagrammatically illustrated at 44 in FIG. 1, it will rise above the obstruction to the clearing position shown in chain line at 42A, by pivoting about shaft 39. It will be observed that the blade rests within the plates 31, 32 of the subframe in the clearing position.

Turning now to the knife subframe 17, it includes a flat plate 45 which extends laterally and acts as a stiffening flange, as in an I-beam, for example, to provide lateral stability. The lower portion of the plate 45 is bent slightly downwardly as at 46; and the forward portion is bent upwardly (see portion 47 shown in dashed line in FIG. 1) and welded to the bottom of a pivot plate 48. An inverted channel-shaped member generally designated 50 is welded lengthwise to the upper surface of plate 45; and the channel 50 and plate 45 cooperate to provide the knife subframe 17 with enhanced resistance to lateral deflection. The forward upper edge of the channel 15 is welded to the bottom of the pivot plate 48; and a brace 51 welded between the plate 45 and the pivot plate 48 further strengthens the frame 17. The rear of the pivot plate 48 is welded to a shaft 52 which is journalled in the sleeves 28, 29 welded to the fixed mounting plate 25. Thus, the knife subframe 17 rotates about the axis of the shaft 52 between the use position shown in solid line in FIG. 1 and the clearing position shown in chain line in FIG. 1.

The spring cushion assembly 20 for the knife is similar to the coulter spring cushion assembly 19 already described and need not be described in further detail. The head of the tension bolt of spring cushion assembly 20 is held beneath the forward portion of the pivot plate 48 so that when the knife assembly is moved to the clearance position, the plate 48 rotates clockwise about the shaft 52 thereby pulling the tension rod of the spring assembly 20 downwardly and further compressing the spring. The compression of the spring (which also is pre-loaded to any desired pre-load force) exerts the resetting force on the knife assembly.

To the rear of the knife subframe 17, there are located a pair of mounting plates 54, 55 which are laterally spaced to form a knife mounting means adapted to receive a knife assembly 56. The plates 54, 55 are welded inside the channel 50 and extend rearwardly thereof. As manufactured, the plates 54 flare outwardly slightly to facilitate a vertical adjustment of the knife assembly 56.

The knife asembly 56 includes a shank 57 and a knife 58. The shank may be in the form of two bars having their lower portions formed outwardly to provide a receiving yoke for attaching the upper portion of the knife 58 by means of bolts 59. A hose 60 is located behind the knife 58 and conventionally secured to the knife assembly. The hose 60 communicates the fertilizer to the furrow or slot formed by the knife 58.

The mounting plates 54, 55 extend rearwardly beyond the shaft 57 and are secured together by upper and lower clamping bolts 64, 65 and a centrally located pivot bolt 66 for the furrow closer 22. After the knife assembly is adjusted to its desired elevation for use, the bolts 64, 65 and 66 are then tightened to bring together the flared mounting plates 54, 55 to clamp the knife assembly 56 in the desired position. The pivot bolt 66 is received in a bushing which limits the extent to which that bolt may be tightened. This serves the dual purpose of providing clearance for independent vertical rotation of the closing means as it clears an obstruction and, at the same time, limiting the clamping action of the plates 54, 55 to their desired holding position relative to the knife shank 57.

Referring now to FIG. 2, shims in the form of narrow, flat metal plates designated 53 are located between the shank 57 and the mounting plates 54, 55 for the knife assembly. The shims may be provided with apertures for receiving one or more of the mounting bolts 64–66, and they are slideable along those bolts, but it is not necessary that the bolts be removed to laterally adjust the position of the shank 57. That is to say, if the bolts are loosened, the mounting plates 54, 55 will spring outwardly to facilitate removal of the shank 57 and the shims may then be adjusted to either side as required to align the knife 58 with the coulter 42. Once the shims are so located, the shank 57 is re-inserted and the bolts are then tightened to clamp it securely.

The closer assembly 22 as illustrated is disclosed in the commonly owned co-pending application of William J. Dietrich, Sr., Ser. No. 06/524,905, filed Aug. 22, 1983. The subject matter of said co-pending application is incorporated herein by reference, but briefly, the closing assembly includes a rearwardly extending frame 68 pivotally mounted at its forward end to the pivot bolt 66 and carrying a mounting arm 69 for a disk 70 which has a specially formed annular region diagrammatically illustrated at 72 for deflecting soil gathered by the leading edge of the disk 70 downwardly into the furrow. The disk may be adjusted laterally by means of a bracket 80 (see FIG. 2) and it may be adjusted in the fore-and-aft position by the forward and rear slots illustrated. The spring cushion assembly 23 has its upper end fixed to the top of a mounting bracket 82 mounted by means of the upper clamp bolt 64 to the mounting plates 54, 55, and its lower end bearing against a pivot pin 83 mounted to the frame 68. The spring of the cushion assembly 23 is therefore compressed as the frame 68 pivots about bolt 66 in a clockwise direction as the closer disk 70 encounters an obstruction. Other closer means including conventional packer wheels may be used to close the slot or furrow formed by the knife 58.

Figure 3:
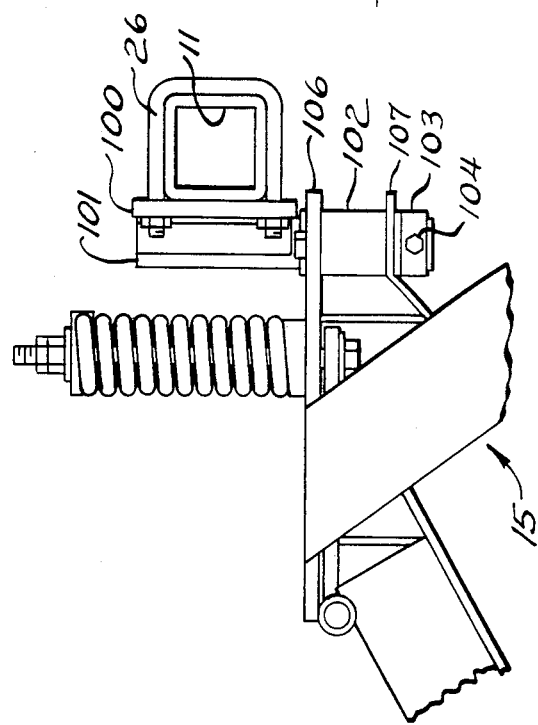
FIG. 3 is a fragmentary close-up side view of an alternate swivel mount for the apparatus.

Turning now to FIG. 3, there is shown an alternative embodiment of the mounting assembly 13. This embodiment is specifically designed for swivel mounting to a tool bar 11, again by means of U-bolts 26. To that end, a vertical mounting plate 100 is secured by the U-bolts to the rear surface of tool bar 11. A shaft 101 is welded to the rear of the plate 100 and extends vertically downward beneath it where it receives a sleeve 102 which may rotate on the shaft 101. The sleeve 102 is held onto the shaft 101 by means of a collar 103 which is fastened to the fixed shaft 101 by means of a bolt 104.

A horizontal mounting plate 106, similar to the previously described horizontal mounting plate 25, receives and is welded to the upper portion of the collar 102. A brace 107 is similarly received on the lower portion of the sleeve 102 and braces the forward portion of the coulter subframe 15. The entire assembly may swivel as the sleeve 102 rotates about the shaft 101, as will be understood by persons skilled in the art.

Returning now to FIG. 1, it will further be appreciated that the inventive applicator assembly provides independent spring cushioning for both the coulter assembly and the knife assembly following behind it. This has the advantage that separate pre-load forces may be set or adjusted for resetting the respective mechanisms. Further, the reset assembly need not accomodate the motion of both elements. Still further, the structure has the advantage that substantial vertical clearance (that is, the distance between the knife and the knife subframe 17) is maintained for all positions of the coulter, and substantial lateral clearance between the coulter and the knife is also maintained for all positions of the coulter while mounting both coulter and knife to the same mounting assembly which facilitates alignment of the knife behind the coulter in use. Another advantage of this arrangement is that since the coulter is not moved when the knife is tripped, as can be seen by the dashed drawing of the knife in the clearance position in FIG. 1, when the knife is moved to the clearance position, it has a disposition better suited to facilitate discharge of accumulated residue. Discharge of residue is further facilitated because of the increased separation between the coulter and knife when only the knife is raised to the clearance position.

Having thus disclosed alternate embodiments of the invention, one of which is suited for a swivel mounting, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

We claim:

1. An improved attachment for applying fertilizer underground and adapted to be pulled by a tool bar drawn by a tractor comprising: tool bar mounting means adapted to be fixed to a single transverse tool bar: a coulter subframe secured to said tool bar mounting means and extending downwardly and forwardly thereof; a coulter assembly including a rotating coulter and an arm pivotally mounted to said coulter subframe adjacent the lower forward end thereof for pivotal movement between a lower use position and a raised clearing position and characterized in that the axis of rotation of said coulter travels generally vertically between said positions; a first spring cushion assembly mounted to said coulter subframe for biasing the coulter assembly to the use position while permitting the same to elevate to said clearing position by said generally vertical movement about said pivot mount; a knife subframe mounted to said tool bar mounting means and extending generally rearwardly thereof and including knife mounting means at a location above the axis of said coulter when both said colter and said knife are in their respective use positions; means for pivotally mounting said knife subframe to said tool bar mounting means for rotation about a transverse axis located above said coulter and rearwardly of the axis thereof for permitting said knife subframe to move between a lowered use position and a raised clearing position; and a knife assembly mounted to said knife mounting means on said knife subframe and characterized in that the lateral clearance between said knife and said coulter is no less than approximately 8 inches for both the use and clearing positions of said coulter; and a second cushion spring assembly carried by said mounting means for biasing said knife subframe to the use position.

2. The apparatus of claim 1 wherein said coulter subframe includes first and second generally parallel plates mounted to said tool bar mounting means and extending downwardly and forwardly thereof in parallel relation, and wherein said coulter means includes an arm, a coulter blade rotatably carried by said arm; and means for pivotally mounting said arm between said first and second plates whereby as said coulter encounters an obstruction in use, said arm will rotate about said pivot and said coulter will nest between said plates in a generally vertical path to maintain a minimum fore-to-aft clearance with said knife.

3. The apparatus of claim 2 wherein said knife subframe comprises a pivot plate pivotally mounted to said tool bar mounting means and extending downwardly and rearwardly thereof; an inverted channel welded to the top of said plate; and knife assembly mounting means for receiving said knife at the rear of said channel.

4. The apparatus of claim 3 wherein said knife assembly mounting means comprises first and second side plates spaced laterally to receive said knife assembly and flared outwardly; and bolt means for securing the rear ends of said plates together after said knife is received therein in vertical adjustment to clamp said knife in the desired elevation relative to said coulter.

5. The apparatus of claim 4 further comprising shim means carried by said clamp bolts and adjustable when said knife assembly is removed from said mounting plates to either side of said knife assembly to facilitate lateral alignment of said knife assembly with said coulter blade.

6. The apparatus of claim 5 wherein one of said clamp bolts of said knife mounting means provides a closing means pivot, said apparatus further including closing means mounted to said closing means pivot for closing the furrow behind said knife after said fertilizer is deposited in the furrow formed by said knife.

* * * * *